United States Patent
Tribe

[11] 3,905,654
[45] Sept. 16, 1975

[54] SKID CONTROL SYSTEM FOR DUAL BRAKE

[75] Inventor: Leonard T. Tribe, Ann Arbor, Mich.

[73] Assignee: Kelsey-Hayes Company, Romulus, Mich.

[22] Filed: Nov. 14, 1973

[21] Appl. No.: 415,816

[52] U.S. Cl............... 303/21 F; 303/10; 303/21 AF
[51] Int. Cl.[2]..................... B60T 8/04; B60T 13/16
[58] Field of Search.......... 303/21 F, 21 AF, 61–63, 303/68–69, 10; 188/181 A, 345

[56] References Cited
UNITED STATES PATENTS

| | | | |
|---|---|---|---|
| 3,514,162 | 5/1970 | Erlebach et al. | 303/21 F |
| 3,515,440 | 6/1970 | Every et al. | 303/21 F |
| 3,610,701 | 10/1971 | Riordan | 303/21 F |
| 3,672,731 | 6/1972 | Koivuner | 303/21 F |
| 3,677,608 | 7/1972 | Lewis | 188/181 A |
| 3,704,044 | 11/1972 | Ingram et al. | 303/21 F |
| 3,746,402 | 7/1973 | Hickner | 303/21 F |
| 3,801,160 | 4/1974 | Schafer et al. | 303/21 F |

*Primary Examiner*—Trygve M. Blix
*Assistant Examiner*—Douglas C. Butler
*Attorney, Agent, or Firm*—Harness, Dickey & Pierce

[57] ABSTRACT

A skid control unit for a dual brake system having separate master cylinders serving individual wheel cylinders. The skid control unit includes a control valve and an expansion chamber device interposed in each circuit between the master cylinder and the respective wheel cylinders. The control valve is movable to a closed position to block communication between the master cylinder and the wheel cylinder in response to a predetermined signal indicative of an incipient skid condition. The expansion chamber is then permitted to increase the volume so as to relieve the wheel cylinder pressure and release the brakes. Upon reapplication, the expansion chamber is decreased in volume to increase the wheel cylinder pressure and cause brake reapplication. Subsequently, the control valve is opened to return communication between the master cylinder and the wheel cylinders. The interconnection between the expansion chamber and the control valve is such that the control valve is not reopened until a higher pressure exists in the expansion chamber than the pressure that existed at the time the control valve was closed. This permits a smoother brake reapplication and acts to assist in preventing subsequent wheel lock-up. The expansion chamber and control valve are operated, in part, by an ancillary source of fluid pressure such as the pressure of a power steering pump. A regulator maintains a pressure in the ancillary fluid that is dependent upon the pressure in the brake system. The regulator is constructed so that it is responsive to the pressure in the brake system having the higher pressure and failure of the hydraulic system of one brake circuit will not interfere with operation of the regulator. Fail safe systems are provided for by-passing the control valve and the expansion chamber of each brake circuit in the event of failure of the ancillary fluid pressure source.

22 Claims, 1 Drawing Figure

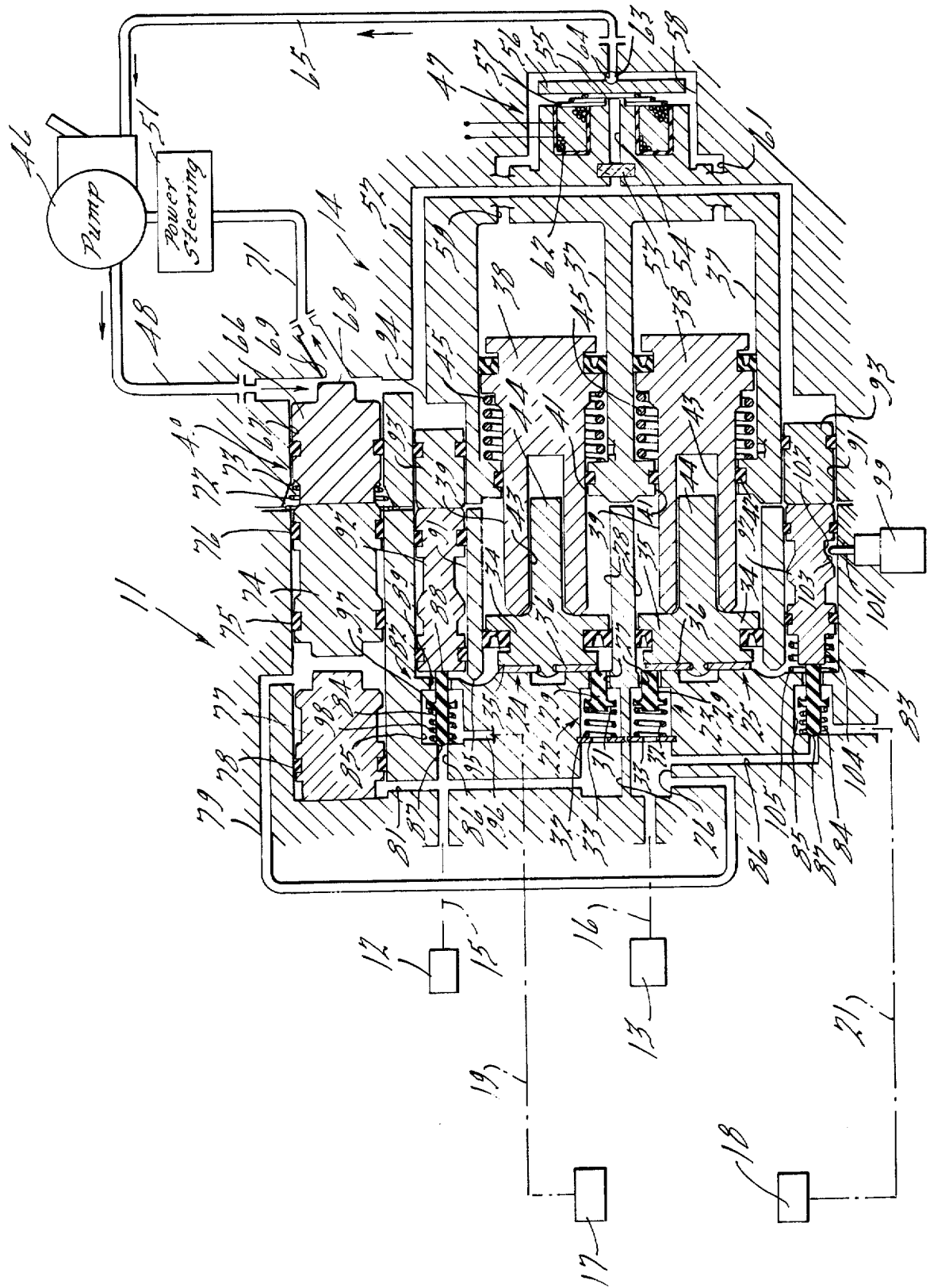

3,905,654

SKID CONTROL SYSTEM FOR DUAL BRAKE

BACKGROUND OF THE INVENTION

This invention relates to a skid control system and more particularly to an improved skid control system for a dual brake unit.

Most skid control systems include a control valve and an expansion chamber that are interposed in the brake circuit between the master cylinder and the wheel cylinder. In response to a predetermined signal, the control valve is closed to block communication between the master cylinder and the wheel cylinders. When the control valve moves to its closed position the expansion chamber is permitted to increase in volume so as to relieve the pressure that exists in the wheel cylinders and, in effect, release the brakes. Upon reapplication, the expansion chamber is decreased in volume to generate an increased braking force. The control valve is then subsequently reopened to permit communication between the master cylinder and the wheel cylinder. With the normal skid control system, the operator will have retained the pressure in the master cylinder during the aforenoted cycle. In fact, it is not uncommon for the master cylinder pressure to continue to increase during this cycle. Thus, when the control valve is reopened a sudden surge of pressure is exerted on the wheel cylinders which may again result in wheel lock-up. Arrangements have been provided for reducing the pressure buildup at the time the control valve opens by using what is known as a check and bleed valve. These valves actually comprise two separate valves that control a restricted and a less restricted flow path. Of course, such an arrangement is expensive.

It is, therefore, a principal object of this invention to provide a skid control system in which the pressure buildup upon reapplication is more gradual than that provided by previously proposed systems.

It is another object of the invention to provide a skid control system in which the pressure buildup upon reapplication is controlled without the use of expensive combination check and bleed valves.

In one type of brake system, a plurality of master cylinders are provided each of which serves a separate wheel cylinder or series of wheel cylinders. In one type of system, the master cylinders may serve separate wheel cylinders of the same wheel brake. Such an arrangement provides considerable safety features to insure effective braking in the event of failure of either master cylinder, wheel cylinder circuit. In order to provide a skid control for such a braking system, it is necessary to provide a skid control device that will operate in each brake circuit.

It is, therefore, a further object of this invention to provide an improved skid control system for a dual brake arrangement.

In skid control systems, as has been noted, there is an expansion chamber and a control valve that are operated between normal braking positions and skid control positions. Some source of ancillary power is required to move these components. Recently it has been proposed to employ an ancillary fluid pressure source such as the power steering pump of the vehicle as this ancillary power source. However, the ancillary fluid must resist the normal fluid pressure in the brake system when the ancillary fluid source is employed to hold the skid control system in its normal braking position. The pressure in the brake system can and does, of course, generally depend upon the degree of brake application. It has, therefore, been proposed to employ a regulator for increasing the ancillary fluid pressure in response to increase in the brake pressure. With a dual braking system of the type noted it is desirable to avoid duplication of too many components in the skid control system to reduce cost. However, it is also desirable to maintain the safety conditions, for operation of the entire system in the event of failure of one of the two circuits.

It is, therefore, a further object of the invention to provide a regulated hydraulically operated skid control system for dual brakes in which the regulator will be operative in the event of failure of either brake circuit.

It is another object of the invention to provide a dual brake skid control system having a single regulator that is responsive to the pressure in either one of the brake circuits.

In order to further enhance the safety aspects of the invention, it is a further object to provide a fail safe bypass that permits normal brake operation in a dual brake system in the event of failure of the ancillary fluid pressure circuit.

SUMMARY OF THE INVENTION

A first feature of this invention is adapted to be embodied in a brake system that includes a source of actuating fluid, a wheel brake and conduit means interconnecting the source with the wheel brake for actuating the wheel brake. A skid control system is interposed in the circuit between the source and the one wheel brake. The skid control system comprises valve means in the circuit movable between the open position permitting flow between the source and the wheel brake and a closed position restricting flow from the source to the wheel brake. Power means responsive to a first signal are provided for permitting the valve means to move from its open position to a closed position to prevent a skid condition and responsive to a second signal for moving the valve means back to its open position. Means are further incorporated that delaying the reopening of said valve means upon movement of the power means in response to the second signal.

Another feature of the invention is also adapted to be embodied in a brake system comprising a source of actuating fluid, a wheel brake, conduit means interconnecting the source with a wheel brake for actuating the wheel brake and a skid control system interposed in the circuit between the source and the wheel brake. The skid control system comprises valve means in the circuit and movable between an open position for permitting flow from the source to the wheel brake and a closed position preventing flow from the source to the wheel brake. An expansion chamber device is interposed between the valve means and the one wheel brake. Means responsive to a first signal indicative of an incipient skid is operative for moving the valve means from its open position to a closed position and for increasing the volume of the expansion chamber device for relieving wheel brake pressure and responsive to a second condition to first decrease the volume of the expansion chamber device to reapply pressure to the wheel brake and subsequently open the valve means. With such an arrangement the invention comprises the improvement of precluding reopening of the valve means until the pressure in the expansion chamber device exceeds the pressure that existed therein at the time the valve means was moved to its closed position.

Another feature of the invention is adapted to be embodied in a dual braking system comprising first and second operator controlled sources of actuating fluid, first and second wheel cylinders, first and second circuits connecting, respectively, the operator controlled source in the wheel cylinders. The operator controlled sources are simultaneously operable. A first skid control system is interposed in the first circuit and is movable from a normal braking position permitting full pressure from the first source to be applied to the first wheel cylinder to a skid control position to reduce the pressure in the first wheel cylinder in response to a predetermined signal to prevent a skid condition. A similar, second skid control system is interposed in the second circuit for achieving the same result. Means including a common source of ancillary fluid pressure is provided for holding each of the skid control systems in their normal braking position. Means provide a bypass circuit from each source to each wheel cylinder in response to failure of the ancillary pressure source to provide sufficient pressure to hold the skid control systems in their normal braking positions.

Still another feature of the invention is also adapted to be embodied in a dual braking system comprising first and second operator controlled source of actuating fluid, first and second wheel cylinders, and first and second circuits connecting, respectively, the operator controlled source in the wheel cylinders. The operator controlled sources are simultaneously operable. A first skid control system is interposed in the first circuit and is movable from a normal braking position permitting full pressure from the first source to be applied to the first wheel cylinder to a skid control position to reduce the pressure in the first wheel cylinder in response to a predetermined signal to prevent a skid condition. A similar, second skid control system is interposed in the second circuit for achieving the same result. Means including a common source of ancillary fluid pressure is provided for holding each of the skid control systems in their normal braking position. A regulator is provided for maintaining a predetermined pressure in the ancillary fluid pressure source that is dependent upon the pressure in the sources of operator controlled actuating fluid.

BRIEF DESCRIPTION OF THE DRAWINGS

The single FIG. of the drawing illustrates, in part schematically, a dual braking system embodying this invention.

DETAILED DESCRIPTION OF THE PREFERRED EMBODIMENTS

A dual braking system embodying this invention is identified generally by the reference numeral 11. The braking system includes separate, simultaneously actuatable master cylinders 12 and 13 that deliver brake fluid under pressure to a dual modulator assembly, indicated generally by the reference numeral 14, via conduits 15 and 16. Wheel cylinders 17 and 18 are served from the modulator 14 via respective conduits 19 and 21, in a manner which will become more apparent. The wheel cylinders 17 and 18 may operate brake shoes of a single wheel drum type brake, separate or the same brake pads of a disk type brake or disk or drum type brakes of separate wheels.

the modulator 14 is of the dual type and includes control valves 22 and 23 and expansion chambers 24 and 25 interposed in the circuits interconnecting the master cylinders 12 and 13 with the respective wheel cylinders 17 and 18. Since the control valves 22 and 23 and associated expansion chambers 24 and 25 are identical in construction only one set will be described in detail. The corresponding parts of the other set are identified by identical reference numerals for clarity.

The control valve 22 includes a bore 26 that terminates at a passage 27 that extends to a larger bore 28 of the expansion chamber 24. A slideable valve member 29 extends through the passage 27 and has an enlarged head 31 that is adapted to seatingly engage the portion of the passage 27 terminating at the bore 26 to control flow through the passage 27 from the bore 26 to the bore 28. The valve member 29 is normally biased to a closed position by a coil spring 32 that engages the head 31 and a snap ring 33 held in the bore 26.

An expansion chamber plunger 34 is slideably supported in the expansion chamber bore 28 and has a head 35 to which is affixed a Bellville spring 36. In the normal braking position, as shown on the figure, the peripheral edge of the Bellville spring 36 engages the valve element 29 and holds it in its open position to permit communication between the bore 26 and the bore 28 through the passage 27.

At the base of the bore 28 a further bore 37 is formed. A power piston 38 is slideably supported in the bore 37 and has an end portion 39 that extends through a restricted opening 41 that interconnects the bores 37 and 28. An "O" ring seal 42 is positioned in the opening 41 and engages the piston portion 39 to effect a seal between the bores 28 and 37. The power piston portion 39 has an axially extending opening 43 in which a projection 44 of the expansion chamber plunger 34 is received. The power piston portion 39 normally engages the expansion chamber plunger 34 and holds it in the normal braking position as illustrated.

A coil spring 45 encircles the power piston 38 within the bore 37 and biases the power piston 38 toward a skid control position. Ancillary fluid pressure, provided by a power steering pump 46 is admitted to the bore 37 via conduits, to be described, and a skid control valve, indicated generally by the reference numeral 47, to hold the power piston 38, expansion chamber plunger 34 and control valve 29 in their opened positions.

The power steering pump 46 is driven by a vehicle engine (not shown) and draws fluid from a sump (not shown) for discharge through a conduit 48 into a regulator, indicated generally by the reference numeral 49. From the regulator 49 the power steering fluid may flow to the power steering unit, indicated schematically at 51 and through a conduit 52 and filter 53 to the inlet passage 54 of the skid control valve 47. The passage 54 terminates at a valve seat 55 to which is juxtaposed a control valve element 56. The valve element 56 is normally biased to an opened position by means of a spring 57 so as to permit fluid to flow from the passage 54 into an enlarged chamber 58 from the valve 47. The chamber 58 is in fluid communication with the bore 37 of the power piston associated with the expansion chamber 24 by means of a passage 59. In a similar manner, the chamber 58 is in communication with the bore 37 of the power piston associated with the expansion chamber 25 by means of a passage 61.

A solenoid winding 62 encircles the passage 54 and is juxtaposed to the valve plate 56. When energized the solenoid winding 62 draws the valve plate 56 toward the valve seat 55 to close communication from the passage 54 to the chamber 58. Simultaneously, a return valve portion 63 of the valve plate 56 moves away from a seat 64 to open communication between a return passage 65 and the chamber 58. The return passage 65 leads back to the sump (not shown) that is in communication with the pump 46. When the return passage 65 is in open communication with the chamber 58, the bores 37 will be exposed to sump pressure and the springs 45 will urge the respective power pistons 38 toward their skid control positions.

The regulator 49 maintains a pressure in the conduit 52 that is dependent upon the pressure in the circuit associated with either of the master cylinders 12 and 13. The regulator 49 includes a regulator piston 66 that is supported in a bore 67 that is in open communication with the conduit 48. The regulator piston 66 has a head portion 68 that cooperates with a discharge opening 69 that feeds a conduit 71 that communicates with the power steering unit 51. The portion 68 cooperates with the opening 69 to adjust the degree of flow restriction and, accordingly, the pressure in the conduit 52 that communicates with the bore 67.

A conical spring 72 engages a shoulder 73 on the regulator piston 66 to urge the piston 66 to a position that maintains a predetermined, minimum pressure in the conduit 52 as long as the power steering pump 46 is operative.

The bore 67 extends beyond the regulator piston 66 and slideably supports a piston 74 that carries seals 75 and 76 that sealingly engage the bore 67. A further piston 77 is also slideably supported in the bore 67 and carries a seal 78 that engages the bore 67. The area between the pistons 74 and 77 is exposed to the pressure in the master cylinder 13 via a conduit 79 that extends from the respective bore 26 of the control valve 23. The portion of the bore 67 to the left of the piston 77 experiences the pressure in the master cylinder 12 via a conduit 81 that extends from the bore 26 of the control valve 22. As shall become apparent from the ensuing description of the operation of the system 11, the regulator 49 maintains a pressure in the conduit 52 that is dependent upon the pressure generated by either the master cylinder 12 or the master cylinder 13. More specifically, the regulated pressure is determined by the highest pressure exerted by either the master cylinder 12 or the master cylinder 13.

Associated with each control valve 22, 23 and expansion chamber 24, 25 is a respective fail safe bypass 82 and 83. The fail safe bypass 82 and 83 are the same in construction and each insures a source of actuating fluid from the respective master cylinders 12 or 13 to the wheel cylinder 17 or 18 in the event of failure in the ancillary fluid pressure system. Because the construction of each valve 82 and 83 is identical, only one will be described in detail and corresponding parts of the other will be identified by the same reference numeral.

The bypass device 82 includes a compound valve member 84 that is slideably supported in a bore 85. The bore 85 is intersected centrally by a passage 86 that is in communication with the master cylinder conduit 15. The valve member 84 has a headed portion 87 that controls the flow through the passage 86 and provides a fail safe bypass, as will become apparent. An extension 88 of the valve member 84 extends through an enlarged opening 89 formed at one end of the bore 85 and into a larger bore 91. First and second pistons 92 and 93 are slideably supported in the bore 91. Each of the pistons carries respective "O" ring seals that sealingly engage the bore 91 and the piston 93 is exposed to the pressure in the conduit 52 by means of a conduit 94. Normally the pressure in the conduit 52 is sufficient to urge the piston 93 and, accordingly, the piston 92 to an extreme left hand position to hold the bypass valve portion 87 in a closed position. Actuating brake fluid under these circumstances passes from the expansion chamber bore 28 to the left hand end of the bore 91 and a passage 95. From the bore 91 the brake actuating fluid passes through the opening 89 into the bore 85 and thence to the brake conduit 19 via a passage 96.

The valve member 84 has a second valve portion 97 that is urged by means of a coil spring 98 and by fluid pressure from the respective master cylinder to a closed position around the opening 89, for a reason which will become apparent.

As has been noted, the bypass valves 82 and 83 are substantially the same in construction. The valve 83 is equipped, however, to actuate an indicator in the event of failure. For this purpose, a switch 99 is juxtaposed to the bore 91 and has an actuating portion 101 that is received in a notched groove 102 in the piston 92. An inclined ramp 103 is formed at one end of the groove 102 for operating the switch. The piston 92 also has a reduced diameter end portion 104 around which is received a coil spring 105. The coil spring 105 urges the piston 92 toward the right, as viewed in the figure, in the event of failure of pressure in the conduit 52. The spring 105 is, however, not sufficiently strong so as to overcome the minimum normal pressure that is maintained in the conduit 52.

OPERATION

The figure of the drawing illustrates the skid control system as it appears for normal brake operation. Under this condition actuation of the master cylinders 12 and 13 causes hydraulic fluid under pressure to flow through the respective conduits 15 and 16 into the bores 26 of the control valve 22 and 23 respectively. Since the power pistons 38 of the expansion chamber device will be maintained in the left hand position the control valves 29 will be held open and brake fluid can pass through the open control valve into the expansion chamber bores 28. The fluid then flows through the passages 95 into the bores 91 and past the isolation valve portion 97 of the fail safe valve into the bores 85. Fluid is then discharged to the respective wheel cylinders 17 or 18 through the conduits 19 or 21.

The pressure from the master cylinder 12 will be exerted on the left hand side of the regulator piston 77 and the pressure from the master cylinder 13 will be exerted on the right hand side of the regulator piston 77 and on the left hand side of the regulator piston 74. Assuming that these pressures are equal, the regulator will maintain a pressure as determined by the pressure acting on its piston 74. Thus, the pressure acting on the power pistons 38 of each expansion chamber will be maintained in relationship to the master cylinder pressure. This pressure will be transmitted through the conduit 52 past the open valve piston 56 into each of the bores 37. The pressure will also be exerted on the pistons 93 of the fail safe device 82 and 83 to maintain the bypass valve portions 87 in closed position and the isolation valve portion 97 in an open position.

It should be noted that the regulators 49 will maintain a pressure in the conduit 52 that is dependent upon the highest pressure of either the master cylinder 12 or the master cylinder 13. If the master cylinder 12 exerts a higher pressure than the master cylinder 13, the pressure acting on the left hand side of the regulator piston 77 will be greater than the pressure acting on the right hand side and this pressure will determine the regulator pressure. In a like manner, if the master cylinder 13 exerts a higher pressure, this pressure will act directly on the regulator piston 74 to achieve regulation with this pressure. It should be noted that failure of either master cylinder will not render the regulator 47 inoperative due to the fact that it is responsive to the highest master cylinder pressure.

If a skid condition is sensed the solenoid winding 62 is energized by means of a suitable circuit (not shown) and the valve plate 56 is drawn toward the windings to close the passage 54 and open the return passage 65. When this occurs, the bores 37 of the expansion chamber 24 and 25 will be exposed to sump pressure and the springs 45 and brake pressure acting on the plunger 35 will tend to cause these elements to move to the right. Initial movement of the expansion chamber pistons 34 to the right will cause the Belleville springs 36 to move to their normal position. During this movement, the control valves 29 will be held open and there will be no reduction in pressure in the brake circuit since the master cylinder will maintain the pressure demanded by the operator. After a degree of initial movement, the Belleville springs 36 will move away from the control valves 29 and permit the control valves to move to a closed position and isolate the master cylinders 12 and 13 from the respective wheel cylinders 17 and 18 and permit the associated wheel or wheels to spin up and relieve the possible skid condition.

At a predetermined instant the brakes are reapplied by discontinuing the flow of current to the solenoid winding 62 and permitting the valve piston 56 to be urged by the spring 57 to the position shown in the FIGURE. When this happens, the pressure in the conduit 52 will again be exposed in the power piston bores 37 to urge the power pistons 38 to the left. When this occurs, the expansion chamber pistons 34 will compress the fluid trapped in the bores 28 and will exert an increasing pressure on the wheel cylinders 17 and 18. It should be noted that the control valve 29 will be maintained in a closed position during this cycle by the combined action of the springs 32 and the continued pressure that is exerted in the bores 26. It is assumed that the operator will maintain, or in fact, increase mastser cylinder pressure at this time.

The increase in pressure in the wheel cylinders 17 and 18 continues up to and through the time that the undeformed Belleville spring 36 engages the control valves 29. At this point the pressure in the wheel cylinders will be equal to the pressure that existed at the time the control valves 29 were closed. Continued movement of the expansion chamber pistons 34 causes a further increase in pressure, the control valves 29 being maintained in a closed position by the pressure in the bores 26. Eventually the springs 36 will deflect and engage the head of the pistons 24 and the valves 29 will then be opened and permit communication between the master cylinder 12 and 13 and wheel cylinders 17 and 18.

At the time the control valves 29 are opened a sudden rise in pressure will be experienced in bores 28 and, accordingly, in the wheel cylinders 17 and 18. This is undesirable for effective skid control operation. The delayed opening of the control valve during the time the Belleville washer is being deflected allows time for an anti skid signal to be applied causing the plunger 34 to move to the right before the check valve can be moved off the seat.

In the event of failure of the pump 46 or some other component in the ancillary fluid pressure circuit the pressure in the bores 37 will decrease tending to cause the system to go into a skid cycle inadvertently. This is precluded, however, by the fail safe devices 82 and 83. In the event of such pressure failure the valve elements 84 will be shuttled by the action of the springs 98 and by fluid pressure from the respective master cylinder to an extreme right hand position. When this occurs, the isolation valve 97 will close the passages 89 and isolate the expansion chamber bores 28 from the wheel cylinders 17 and 18. At the same time the bypass valve portion 87 will open and permit direct fluid communication from the master cylinder 12 and 13 to the wheel cylinders 17 and 18 through the passage 86, bore 85 and passage 96. Hence, normal brake operation will be accomplished. The isolation of the expansion chambers 28 from the wheel cylinders 17 and 18 also insures that this operation is experienced with minimum loss of fluid into the expansion chambers 28.

At the time the piston 92 associated with the bypass device 83 moves to the right under the action of the coil spring 105 the switch 99 will be actuated to provide the vehicle operator with an indication of skid control failure.

It is to be understood that the foregoing description is that of a preferred embodiment of the invention. Various facets of the invention are susceptible of use in other combinations, as will be apparent to those skilled in the art, and such modifications are within the appearance and scope of the invention as indicated in the appended claims.

I claim:

1. In a brake system comprising a source of actuating fluid, a wheel brake and conduit means interconnecting said source with said wheel brake for actuating said wheel brake, the improvement comprising a skid control system interposed in said circuit between said source and said one wheel brake, said skid control system comprising valve means in said circuit movable between an open position permitting flow from said source to said wheel brake and a closed position restricting flow from said source to said wheel brake, power means responsive to a first signal for permitting said valve means to move from its opened position to its closed position to prevent a skid condition and responsive to a second signal for moving said valve means back to its opened position, said power means including an element having a first position in which said valve means is in its normal opened position, a second position spaced from said first position in which said valve means is retained in its normal opened position and a third position in which said valve means may move from its normal opened position to its closed position, and means for delaying the opening of said valve means upon operation of said power means by said second signal, said delaying means being effective to require movement of said power means from its third position past its second position toward its first position before said valve means may move from its closed position to its opened position.

2. A brake system as set forth in claim 1 wherein the delaying means comprises an operative connection between said power means and the valve means.

3. A brake system as set forth in claim 2 wherein the operative connection includes spring means.

4. A brake system as set forth in claim 3 wherein the spring is in a first condition when the power means element is in its first position and a second condition when the power means element is in its second position, reopening of the valve means when the spring means is in its second condition being delayed by the requirement of said spring means to move to its first condition before said valve means can open.

5. A brake system as set forth in claim 1 wherein the power means includes a source of ancillary fluid pressure for holding the valve means in its opened position.

6. A brake system as set forth in claim 1 further including an expansion chamber interposed between the valve means and the wheel brake, the power means being effective to permit an increase in volume of said expansion chamber after said valve means has moved to its closed position for reducing the pressure in the one wheel brake.

7. A brake system as set forth in claim 6 wherein the delaying means comprises an operative connection between said power means and the valve means.

8. A brake system as set forth in claim 7 wherein the operative connection includes spring means.

9. A brake system as set forth in claim 8 wherein the power means includes a source of ancillary fluid pressure for holding the valve means in its opened position.

10. In a brake system comprising a source of actuating fluid, a wheel brake, conduit means connecting said source with said wheel brake for actuating said wheel brake, and a skid control system interposed in said circuit between said source and said wheel brake, said skid control system comprising valve means in said conduit and movable between an opened position permitting flow from said source to said wheel brake and a closed position for preventing flow from said source to said wheel brake, an expandable chamber device interposed between said valve means and said one wheel brake and means responsive to a first signal indicative of an incipient skid condition for moving said valve means from its open position to a closed position and permitting an increase in volume in said expandable chamber device for relieving the wheel brake pressure and responsive to a second condition to first decrease the volume of said expandable chamber device to reapply pressure to said wheel brake and subsequently to open said valve means, the immprovement comprising means for precluding reopening of said valve means until the pressure in said expandable chamber device exceeds the pressure that existed therein at the time said valve means moved to its closed position.

11. A brake system as set forth in claim 10 wherein the expandable chamber device comprises a movable member and means providing an operative connection between the movable member and the valve means.

12. A brake system as set forth in claim 11 wherein the means for precluding the reopening of the valve means includes means in the operative connection between the movable member and the valve means.

13. A brake system as set forth in claim 12 wherein the means for precluding reopening comprises spring means in the operative connection between the movable member and the valve member, said spring means being constructed and arranged to require a predetermined degree of deflection before said valve means can move to its opened position.

14. A brake system as set forth in claim 10 wherein the skid control system further includes an ancillary source of fluid pressure for operating the valve means and the expandable chamber device.

15. A brake system as set forth in claim 14 further including regulator means for maintaining at least a predetermined pressure in the source of ancillary fluid pressure.

16. A brake system as set forth in claim 14 further including fail safe bypass means for providing a fluid circuit between the source of actuating fluid and the wheel brake in response to failure of the ancillary fluid pressure source.

17. A dual braking system comprising a first operator controlled source of actuating fluid, a second operator controlled source of actuating fluid simultaneously operable with said first source, a first wheel cylinder, a second wheel cylinder, a first fluid circuit interconnecting said first wheel cylinder with said first source, a second fluid circuit interconnecting said second wheel cylinder with said second source, a first skid control system interposed in said first circuit and movable from a normal braking position permitting full pressure from said first source to be applied to said first wheel cylinder to a skid control position for reducing the pressure in said first wheel cylinder in response to a predetermined signal to prevent a skid condition, a second skid control system interposed in said second fluid circuit and movable from a normal braking position permitting pressure from said second source to be applied to said second wheel cylinder to a skid control position to reduce the pressure in said second wheel cylinder in response to a predetermined signal to prevent a skid condition, means including a common source of ancillary fluid pressure for holding each of said skid control systems in their normal braking position, and means for regulating the pressure of the ancillary fluid to maintain at least a predetermined minimum pressure in the ancillary fluid.

18. A dual braking system as set forth in claim 17 further including means responsive to the pressure in each of the first and second fluid circuits for altering the pressure of the ancillary fluid in response to changes in pressure in the first and second fluid circuits.

19. A dual braking system as set forth in claim 18 wherein the regulator includes a single valve member responsive to the pressure in each fluid circuit.

20. A dual braking system as set forth in claim 19 wherein the regulator valve is responsive to the higher pressure of the two fluid circuits.

21. A dual braking system as set forth in claim 19 wherein the regulator comprises a bore slidably supporting a regulator valve, the first fluid circuit having a first connection to said bore, the second fluid circuit having a second connection to said bore spaced from said first connection and further including a piston slidably supported within said bore between said first and said second connections.

22. A dual braking system as set forth in claim 21 wherein the source of ancillary fluid pressure comprises a pump adapted to be driven by a vehicle engine and further including a vehicular accessory operated by said pump.

* * * * *